United States Patent
Rausch

(10) Patent No.: US 7,171,080 B2
(45) Date of Patent: Jan. 30, 2007

(54) COUPLING GRATING FOR FOCUSING LIGHT WITHIN A WAVEGUIDE FOR HEAT ASSISTED MAGNETIC RECORDING

(75) Inventor: Tim Rausch, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/988,970

(22) Filed: Nov. 15, 2004

(65) Prior Publication Data

US 2006/0104570 A1    May 18, 2006

(51) Int. Cl.
*G02B 6/34* (2006.01)
*G02B 6/10* (2006.01)

(52) U.S. Cl. .......................................... 385/37; 385/129

(58) Field of Classification Search ................... 385/37, 385/129

See application file for complete search history.

(56) References Cited

U.S. PATENT DOCUMENTS

| | | | |
|---|---|---|---|
| 3,814,498 A * | 6/1974 | Tomlinson et al. ........... | 385/37 |
| 4,274,706 A * | 6/1981 | Tangonan ..................... | 385/37 |
| 4,778,991 A | 10/1988 | Nozaki et al. | |
| 4,833,561 A | 5/1989 | Sunagawa et al. | |
| 4,861,128 A | 8/1989 | Ishikawa et al. | |
| 4,868,803 A | 9/1989 | Sunagawa et al. | |
| 4,927,254 A | 5/1990 | Kino et al. | |
| 5,061,032 A | 10/1991 | Meltz et al. | |
| 5,074,629 A | 12/1991 | Zdeblick | |
| 5,105,403 A * | 4/1992 | Kando et al. ............. | 369/44.12 |
| 5,125,750 A | 6/1992 | Corle et al. | |
| 5,195,071 A * | 3/1993 | Funato et al. ............ | 369/44.37 |
| 5,233,595 A | 8/1993 | Kawakubo | |
| 5,418,765 A | 5/1995 | Misawa et al. | |
| 6,418,249 B1 * | 7/2002 | Nakamura et al. ............ | 385/24 |
| 6,434,303 B1 * | 8/2002 | Temkin et al. ................ | 385/43 |
| 6,441,359 B1 | 8/2002 | Cozier et al. | |
| 2004/0062503 A1 | 4/2004 | Challener | |

FOREIGN PATENT DOCUMENTS

DE    3803178    8/1988

(Continued)

OTHER PUBLICATIONS

Suhara, et al., "High performance focusing grating coupler fabricated by electron-beam writing," 7th Topical Meeting Integrated and Guided Wave Optics, ThD4, Kissimmee, Apr. 1984.
YeungJoon, et al., "High NA focusing grating coupler using blue laser," Proceedings of the SPIE, Optical Data Storage, V 5069, p. 351-356 (2003).

(Continued)

*Primary Examiner*—Kaveh Kianni
(74) *Attorney, Agent, or Firm*—Benjamin T. Queen, II; Pietragallo, Bosick & Gordon LLP

(57) ABSTRACT

A method and apparatus for focusing light within a waveguide is provided. The waveguide includes a curved grating adapted to focus light incident thereon to a focused spot proximate a first end of the waveguide. In another embodiment, the first end of the waveguide has a thickness greater than a portion of the waveguide containing the grating. The waveguide is suitable for focusing light onto a magnetic storage medium and the like, making the waveguide suitable for heat-assisted magnetic recording (HAMR) applications.

15 Claims, 4 Drawing Sheets

FOREIGN PATENT DOCUMENTS

| | | |
|---|---|---|
| EP | 0 288 033 | 10/1988 |
| EP | 0 469 552 | 2/1992 |
| EP | 469552 A2 * | 2/1992 |
| JP | 2003-228848 | 8/2003 |
| WO | WO 00/20848 | 4/2000 |

OTHER PUBLICATIONS

Paek, et al., "Implementation of a Micro-Optical pickup using focusing waveguide grating coupler," Proceedings of the SPIE, Optical Data Storage, V 5069, P345-350, 2003.

* cited by examiner

COUPLING GRATING FOR FOCUSING LIGHT WITHIN A WAVEGUIDE FOR HEAT ASSISTED MAGNETIC RECORDING

CROSS-REFERENCE TO RELATED APPLICATION

This invention was made with U.S. government support under Agreement No. 70NANB1H3056 awarded by the National Institute of Standards and Technology (NIST). The United States government has certain rights in the invention.

FIELD OF THE INVENTION

The invention relates to information technologies, and more particularly, to the use of near field optics.

BACKGROUND OF THE INVENTION

Heat-assisted magnetic recording (HAMR) involves heating a spot on a disk surface to reduce its coercivity sufficiently so that it can be magnetically recorded. The advantage of this technique is that the coercivity of the media at ambient can be significantly increased, thereby improving thermal stability of the recorded data even for very small bit cells.

One of the difficulties with the technique is finding a method to heat just the small area of media which is to be recorded. Heating with laser light, as is done in magneto-optic recording, is the most promising approach, but the difficulty with this is that at the current storage densities contemplated for HAMR, the spot to be heated is many times smaller than the wavelength of useful semiconductor lasers.

The use of mode index lenses has been proposed to focus light in HAMR applications. However, mode index lenses are susceptible to focusing aberrations due to lens thickness variations, i.e., the refractive index of the lens material changes with lens thickness. Mode index lens fabrication processes often suffer from imprecise thickness control, resulting in unpredictable lens performance and thereby adversely limiting robust and repeatable lens to lens uniformity required for the mass production of HAMR systems. Thus, it would be desirable to focus light with an apparatus not adversely affected by lens thickness variations.

Therefore, there is a need for an improved method and apparatus for focusing energy from a light source suitable for use in HAMR applications.

SUMMARY OF THE INVENTION

A method and apparatus for focusing light within a waveguide is provided. The waveguide includes a curved grating adapted to focus light incident thereon to a focused spot proximate a first end of the waveguide. In another embodiment, the first end of the waveguide has a thickness different than a portion of the waveguide containing the grating The waveguide is suitable for focusing light onto a magnetic storage medium and the like, making the waveguide suitable for HAMR applications, and to record on phase change media, among other applications.

In one embodiment, an apparatus for focusing light includes a waveguide having a curved grating formed therein. The grating is adapted to focus the light incident on the waveguide to a focused spot at a first end of the waveguide, wherein the first end is tangent to, or passes through the focused spot.

In another embodiment, an apparatus for focusing light includes a cladding disposed on a core, and a curved grating formed in at least one of the core or the cladding. The grating is adapted to focus light having a wavelength λ and incident on the waveguide with a spot radius r to a focused spot proximate a first end of the waveguide. The light is focused a distance D from the grating. The distance D, defined between a center of the grating and the first end of the waveguide, is expressed as $D=d\pm d_{spot}$, wherein d is the distance between the center of the grating and the center of the focus spot and $d_{spot}$ is the diameter of the focused spot.

In another embodiment, an apparatus for focusing light includes a cladding disposed on the core and a curved grating formed at a first end of the waveguide in at least one of the core or the cladding. The first end of the waveguide has a thickness greater than a portion of the waveguide containing the grating. The grating is adapted to focus the light to a focused spot proximate a first end of the waveguide.

In another embodiment, a magnetic recording device is provided that includes a waveguide, a curved grating formed in the waveguide and an induction coil positioned proximate a first end of the waveguide. The waveguide is configured to focus light incident thereon to point proximate the first end of the waveguide.

In yet another embodiment, a method and apparatus for focusing light on a magnetic storage medium is provided. In one embodiment, a method for focusing light on a magnetic storage medium includes the steps of directing light onto a focusing grating of a waveguide, focusing the light to a spot at a first end of the waveguide and positioning a magnetic storage medium within a near field of the first end.

BRIEF DESCRIPTION OF THE DRAWINGS

Embodiments of the invention are described with reference to the accompanying drawings which, for illustrative purposes, are schematic and not drawn to scale.

To facilitate understanding, identical reference numerals have been used, where possible, to designate identical elements that are common to the figures.

DETAILED DESCRIPTION

Figure 1:
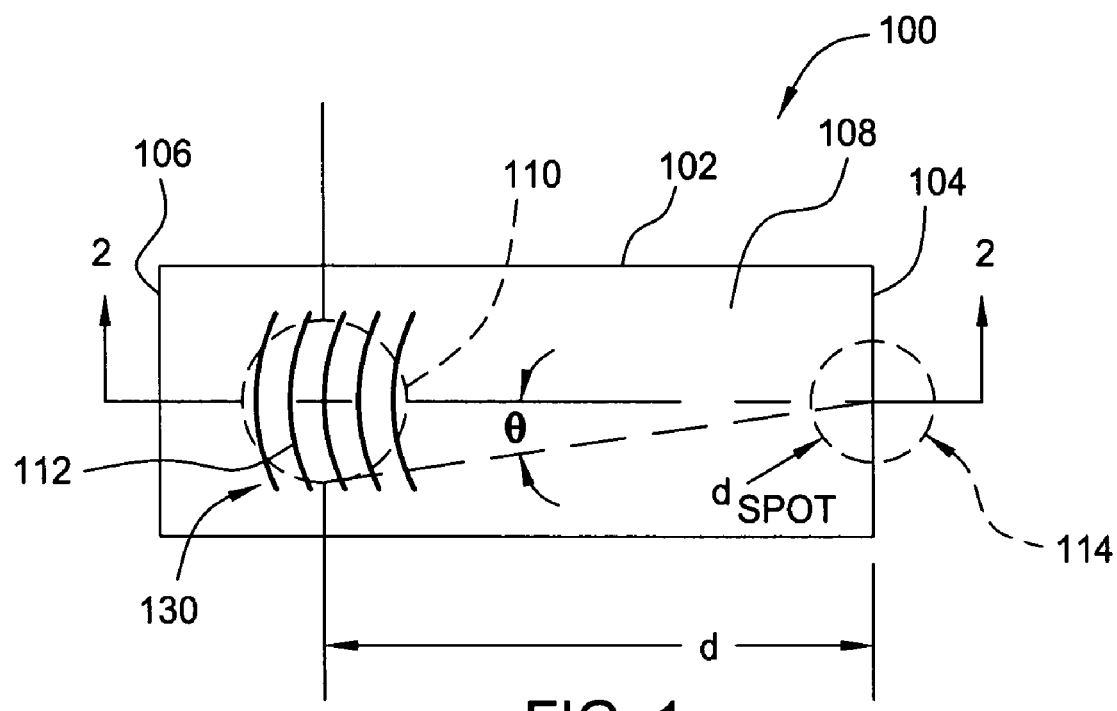
FIG. 1 is plan view of one embodiment of a solid immersion lens of the present invention.
Figure 2:
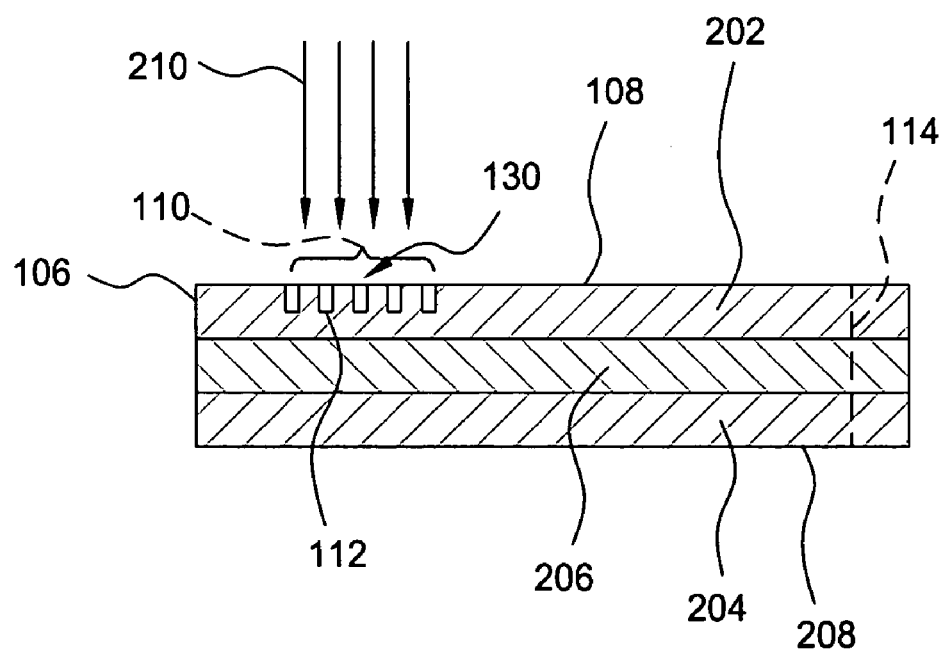
FIG. 2 is a cross-sectional views of the solid immersion lens of FIG. 1.

FIGS. 1 and 2 are respective plan and cross-sectional views of one embodiment of a solid immersion lens 100 of the present invention. The solid immersion lens 100 is formed on an optical waveguide 102 having a first surface 108, a first end 104 and a second end 106. The second surface 208 is disposed opposite the second surface 108 as shown in FIG. 2.

The waveguide 102 includes a core 206 sandwiched between a first cladding layer 102 and a second cladding layer 104. The core 106 and cladding layers 202, 204 may be made of any glass (e.g., silica, phosphate glass, or other glasses), plastic, air or other material suitable for efficient light transmission. In the embodiment depicted in FIGS. 1–2, the core 206 is formed from silicon nitride (SiN) and the cladding layers 102, 104 are formed from silicon dioxide ($SiO_2$).

One or more curved gratings 112 are formed in a grating field 130 defined proximate the second end 106 of the waveguide 102. The gratings 112 may be formed in the cladding layers 202, 204 or the core 206. In the embodiment depicted in FIGS. 1–2, the gratings 112 are formed in the first cladding layer 202.

The curved gratings 212 are configured to focus light (depicted by arrows 210) incident on the waveguide 102 to a focused spot 114 (shown in phantom in FIGS. 1 and 2) proximate the first end 104 of the waveguide 102. The size and number of the gratings 112 are generally configured to allow a spot 110 of the incident light 208 to substantially illuminate the grating field 130. Thus, the size of the grating field 130 may be selected for a predetermined light source and wavelength, along with the apparatus (not shown) utilized to direct the light 208 to the waveguide 112.

The gratings 112 may be formed in the waveguide 112 using holographic grating techniques or e-beam lithography or any other technique used to fabricate thin film structures. The gratings 112 may be alternatively embedded, etched, imprinted, or otherwise formed in the waveguide 102. Exemplary methods of forming a grating which may be adapted to benefit from the invention is described in T. Shuhara, et al., "High Performance Focusing Grating Coupler Fabricated by Electron Beam Writing", Seventh Topical Meeting Integrated and Guided Wave Optics, Th.D4, Kissimmee, April 1984, S. Yeungjoon, et al., "High NA Focusing Grating Coupler Using Blue Laser," Proceedings of the SPIE, Optical Data Storage, V 5069, page 351 (2003) and M. C. Peck, et al., "Implementation of a Micro-Optical Pickup using Focusing Waveguide Grating Coupler," Proceedings of the SPIE, Optical Data Storage, V 5069, page 351 (2003), all of which are hereby incorporated by reference in their entireties.

The solid immersion lens 100 provides efficient focusing of light in the waveguide 102 over conventional mode lens. For example, as light 208 is focused within the waveguide 102, degradation of focusing performance due to thickness variations found in conventional lenses is eliminated. Moreover, if the light 208 is directed at a normal (e.g., perpendicular) incidence to the surface 108, refraction at the surface 108 of the waveguide 102 is minimized, thereby maximizing energy of the focused spot 114. Additionally, the waveguide 102 produces a stationary and predictable focal spot 114 suitable for mass production of robust lenses 100.

In the configuration depicted in the embodiment of FIGS. 1 and 2, a numerical aperture "NA" of the solid immersion lens 100 is related to a distance "d" between the center of the incidence spot 110 and the center of the focus spot 114, and a radius "r" of the incidence spot 110. The numerical aperture NA may be expressed as:

$$NA = n_{sil}\sin\theta = \frac{n_{sil}r}{\sqrt{r^2 + d^2}} \quad (1)$$

while the diameter measured at the full width half max $d_{spot}$ of the focal spot 114 may be expressed as:

$$d_{spot} = \frac{\lambda\sqrt{r^2 + d^2}}{2.25 n_{sil} r} \quad (2)$$

wherein:
  $n_{sil}$ is the refractive index of the layer in which the light is propagating (e.g., the core or cladding); and
  θ is the angle of the rays in the waveguide which can be adjusted by changing the curvature of the gratings and/or the refractive index of the waveguide material.

Thus, as d is a function of θ, the diameter of the focused spot $d_{spot}$ may be reduce by:
reducing d by changing the curvature of the gratings—smaller d will result in a smaller $d_{spot}$.
increasing r—bigger r will result in a smaller $d_{spot}$.
increasing $n_{sil}$—larger $n_{sil}$ will result in a smaller $d_{spot}$.
decrease λ—shorter λ will result in a smaller $d_{spot}$.

For example, light 208 having a wavelength of 405 nanometers and propagating from a source centered about 100 micrometers above the waveguide 102, creates an incident spot 110 having a radius r of 30 micrometers. For a waveguide 102 having a refractive index of 2, the spot size is 313 nanometers.

It is contemplated that the light 208 may be provided in different wavelengths, including visible and infrared spectrums, among others. Using a shorter wavelength will reduce the focal spot size.

Alternative expressions for determining $d_{spot}$ may also be utilized. In one example, the spot size may be predicted using an equation that assumes an infinite plan wave. In another embodiment, the spot size may be predicted by assuming a Gaussian beam, among other methods for determining spot size.

The waveguide 102 may also be configured such that the center of the focused spot 114 is positioned on or off the waveguide 102. In the embodiment depicted in FIGS. 1 and 2, the first end 104 extends through the center of the focused spot 114. It is also contemplated that first end 104 may be positioned tangent with the edge of the focused spot 114 closest the grating 112, tangent with the edge of the focused spot 114 furthest the grating 112, or a any position therebetween.

Figure 3:
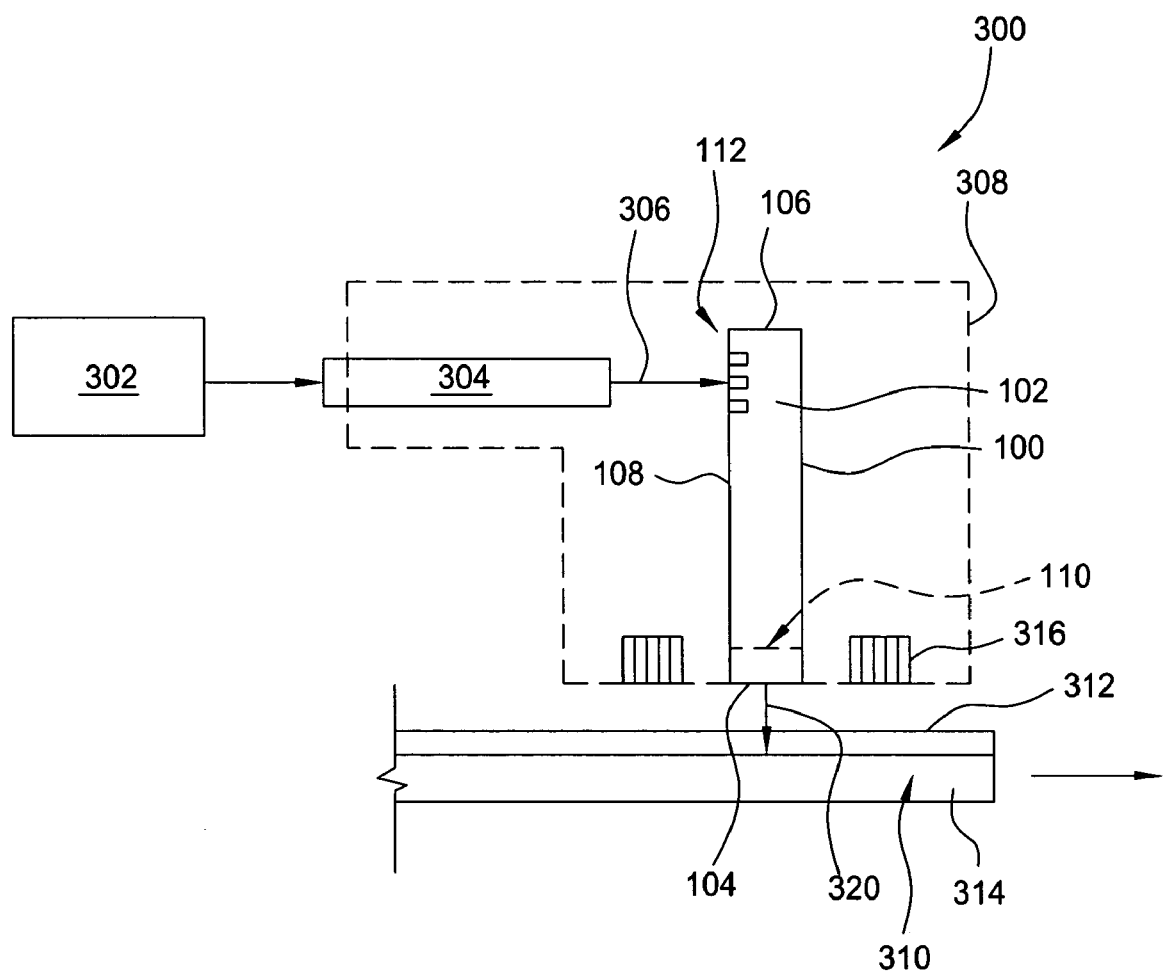
FIG. 3 is a sectional view of a HAMR storage system.

FIG. 3 depicts one embodiment of a heat-assisted magnetic recording system 300 having a solid immersion lens 100. It is contemplated that the lens 100 may be beneficially utilized in other heat-assisted magnetic recording systems and devices, microscopy, lithography and other applications where small optical spots are desirable. The system 300 generally includes a read-write head 308 positionable over a storage disk 310 in a conventional manner. The storage disk 310 is rotated by a motor (not shown) and includes one or more magnetic storage layers 312 and a support layer 314. One storage layer 312 is shown in FIG. 3.

A light source 302, such as a semiconductor laser, generates a light that is provided through a waveguide 304 or other suitable device to the head 308. The waveguide 304 is positioned such that the light 306 is directed from the waveguide 304 normal to a first surface 108 of the waveguide 102 to create an incident spot 110 on a grating 112.

The light 306 is focused by the grating 112 to a focused spot 114. The focused spot 114 may be completely within the waveguide 102 proximate the first end 104, truncated by the first end 104 of the waveguide 102, or positioned in the waveguide 102 proximate the first end 104. In other words, the distance between the center of the incident spot 110, typically centered in the grating 112, and the first end 104 of the waveguide 102 is $d\pm d_{spot}$. The position of the focus spot 114 relative the first end 104 of the waveguide 102 may be selected to heat magnetic layers 312 disposed at different depths in the storage disk 310. It is also contemplated that the center of the focus spot 114 may be changed by altering the diameter of the incident spot 110, changing the wavelength of the incident light, and the like.

The storage disk 310 is disposed perpendicular to the waveguide 102 and is generally within about one quarter of a wavelength (λ/4) of the first end 104. In the embodiment depicted in FIG. 3, the storage disk 310 is disposed between about 20–30 nanometers from the first end 104.

Focused light 320 propagates through the air between the first end 104 of the waveguide 102 and the magnetic layer 312 of the storage disk 310. The focused light 320 lowers the coercivity of the magnetic layer 312 allowing data to be written to the disk 310 by writer 316, such as an induction coil or ampere head, disposed in the head 308 adjacent the first end 104 of the waveguide 102. The magnetic material could also be used to increase the write field by integrating a magnetic write pole with the writer structure.

The head 308 can also be used to write on phase change and magneto optical media of the storage disk 310. In these instances the signal is inferred from the light which is reflected off of the media and back through the waveguide 102 and back out through the grating 122 onto a detector (not shown), which is usually near the light source 302. Alternatively, the detector may be positioned on the other side of the disk 310 to monitoring the light which passes through the media.

Figure 4:
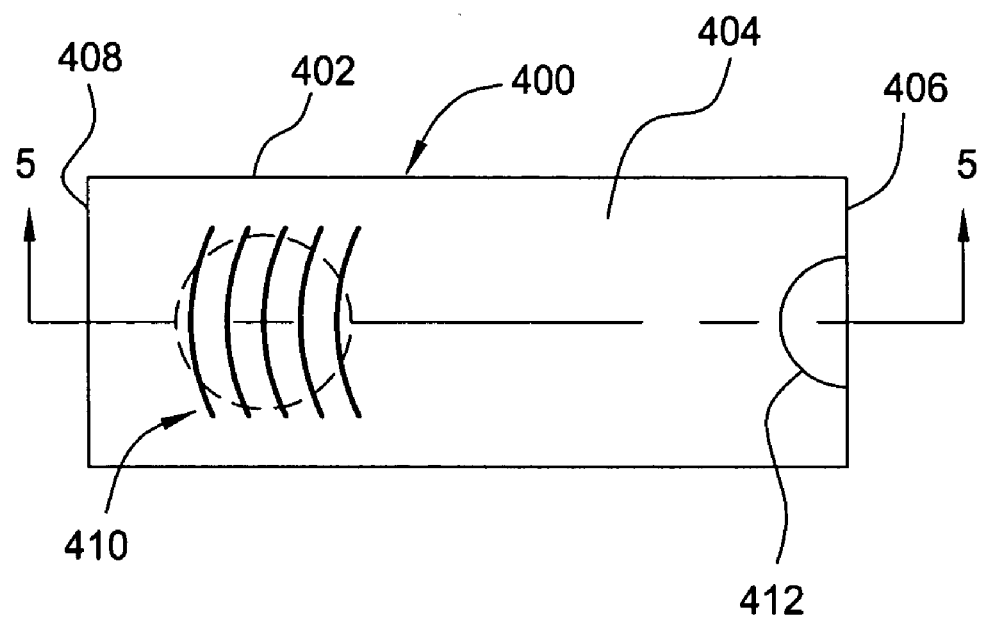
FIG. 4 is plan view of another embodiment of a solid immersion lens of the present invention.
Figure 5:
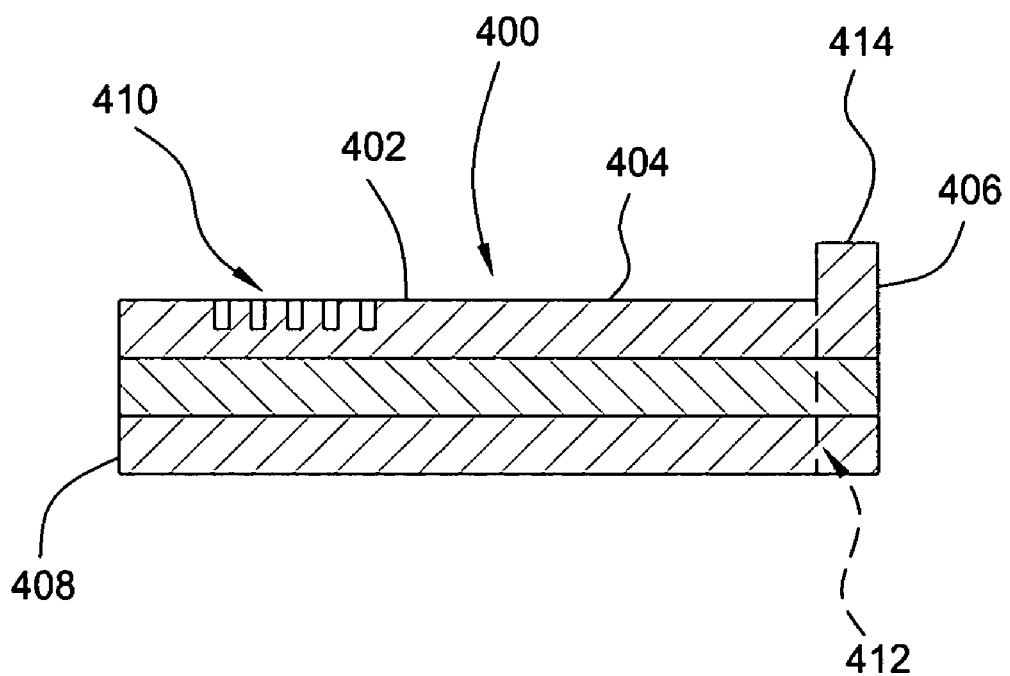
FIG. 5 is a cross-sectional views of the solid immersion lens of FIG. 4.

FIGS. 4 and 5 depict another embodiment of a solid immersion lens 400. The lens 400 may be utilized in a heat-assisted magnetic recording system such as the system 300 described above, among others. The solid immersion lens 400 is substantially similar to the solid immersion lens described above, except at least a portion of a waveguide 402 proximate the first end 406 and containing at least a portion of the focused spot 414 has different thickness relative to a second end 404 of the waveguide 402 having a curved grating 410. In the embodiment depicted in FIGS. 4 and 5, the thickness of the first end 406 is greater than a thickness of the portion of the waveguide 402 having the grating 410. The increased thickness of the waveguide 402 proximate the first end 406 facilitates increased focusing of the incident light by the lens 400. The increased focusing power is due to the increased effective refractive index of the waveguide 402 as the light propagates into the first end 406. In addition, by shaping the portion of increased thickness to focus the light further the spot size can be reduced further. In addition, in some instances rather then increase the thickness of the waveguide proximate to the first end 406 it may be desirable to change the materiel of the waveguide. For example, GaP is known to have a very high refractive index for 405 nm light but attenuates the light strongly. Therefore by making the portion proximate to the first end 406 very small, all the advantages of the high index material can be realized without suffering the loss in optical power from the attenuation. It is contemplated that it may be desirable to reduce the refractive index at the first end 406 relative to the portion of the waveguide 402 containing the grating 410 by reducing the thickness and/or changing the material of the first end 406.

Figure 6:
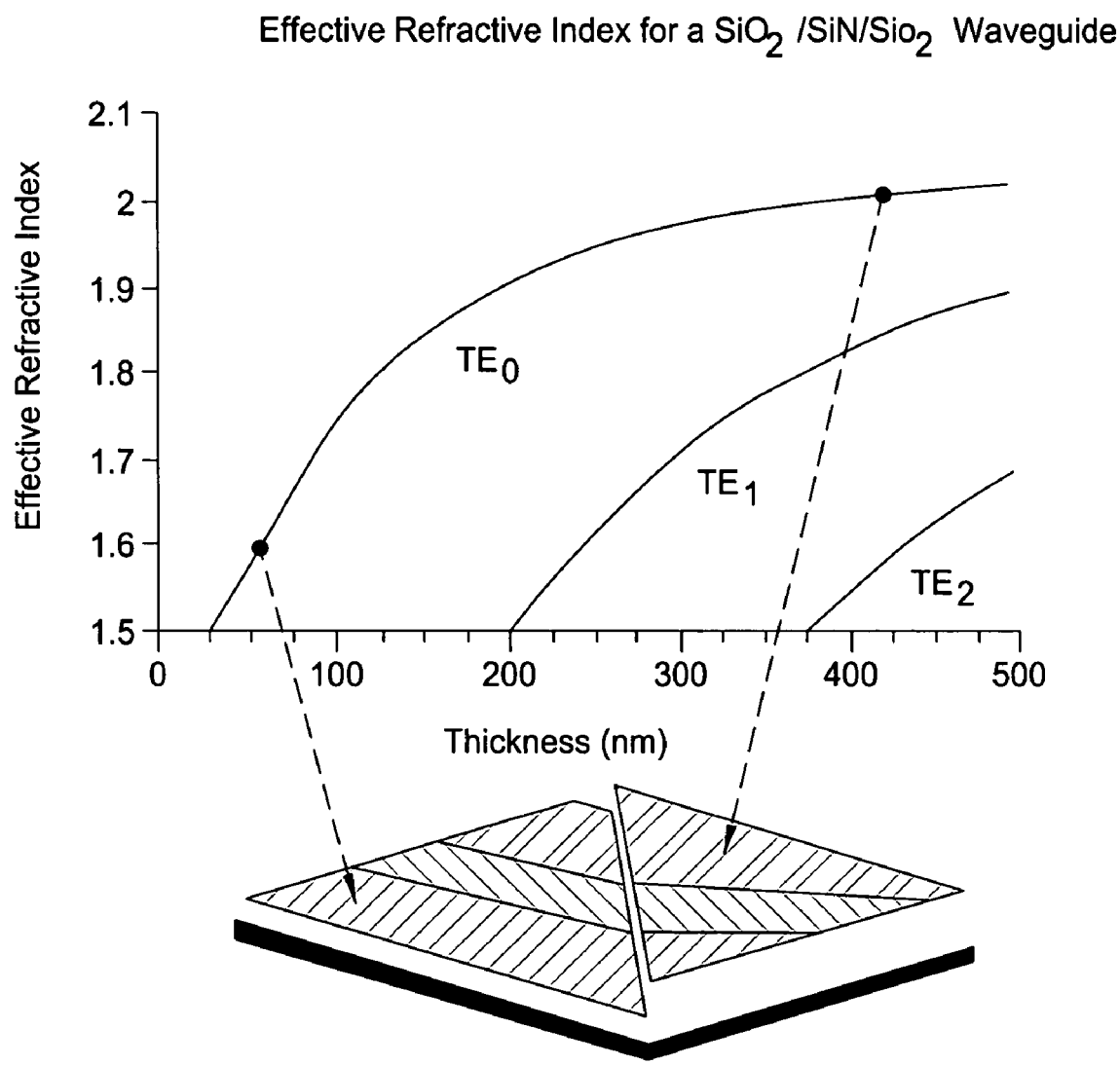
FIG. 6 is a graph depicting Effective Refractive Index verses Thickness of the lens of FIGS. 4–5.

As illustrated in FIG. 6, the mode index of an exemplary $SiO_2/SiN/SiO_2$ waveguide changes with the thickness. Thus, as the thickness of the waveguide increases at near the focused spot 414 at the first end 406, the value of $s_{nil}$ in equation (3) increases, thereby reducing the diameter $d_{spot}$ of the focused spot 414.

In the exemplary embodiment depicted in FIGS. 4–5, the first end 406 of the waveguide 402 has a thickness of 400 nm, while the thickness of the waveguide proximate the second end 408 is approximately 100 nm. Thus, due to the difference in refraction proximate the focused spot 412, the diameter of the focused spot 412 may be expressed as:

$$d_{spot} = \frac{\lambda}{2.25 n_{sil}} \quad (3)$$

providing the geometry of the system is constrained by $$d = r\sqrt{n_{sil}^2 - 1} \quad (4)$$

For example, if the radius r of the incident light remains fixed at 30 micrometers with an $n_{sil}$ index of 2, the distance d between the center of the focused spot 412 and the center of the light incident the grating 412 is 52 micrometers. Under this geometry, equation (3) gives a spot size of 90 nanometers. Advantageously, this small spot size is obtained using only one focusing surface compared to the multiple focusing surfaces of conventional index lenses.

It is contemplated that the thicknesses at the first end 406 of the waveguide 400 relative a portion having the grating 410 formed thereon may have a ratio in the range of about 1:1 to about 5:1, and in one embodiment is at least 4:1. The total thickness of the waveguide 400 is generally in the range of about 2 um to about 5 um. Thus in one embodiment, the thickness of the waveguide at the grating may range between about 0.3 to about 2.5 um while the thickness of the waveguide at the first end may range between 1.0 to about 3.8 um.

Thus, various embodiments of a solid immersion lens have been provided. The lenses allow focusing of light without aberrations due to lens thickness variation associated with mode index lenses. Moreover, the efficient focusing of light energy to small spot sizes allows the lens to be advantageously utilized in HAMR system, among other applications where small focus spot size is desirable.

Although the invention has been described and illustrated with respect to exemplary embodiments thereof, the foregoing and various other additions and omissions may be made therein and thereto without departing from the spirit and scope of the present invention.

What is claimed is:

1. Apparatus for focusing a light, comprising:
   a waveguide; and
   a curved grating formed in the waveguide, the grating arranged to focus the light incident on the waveguide to a focused spot at a first end of the waveguide, wherein the first end is tangent to, or passes through the focused spot, wherein the first end of the waveguide has a greater refractive index greater than a portion of the waveguide adjacent the grating.

2. The apparatus of claim 1, further comprising:
   an induction coil positioned proximate the first end of the waveguide.

3. The apparatus of claim 2, wherein the first end of the waveguide has a thickness greater than a portion of the waveguide having the grating formed therein.

4. The apparatus of claim 2, further comprising:
a light source adapted for selectively illuminating the grating with a light; and
a magnetic storage medium positioned proximate the first end.

5. The apparatus of claim 4, wherein the magnetic storage medium is positioned within a near field of the focused spot.

6. Apparatus for focusing a light, comprising:
a waveguide; and
a curved grating formed in the waveguide, the grating arranged to focus the light incident on the waveguide to a focused spot at a first end of the waveguide, wherein the first end is tangent to, or passes through the focused spot, wherein a thickness of the waveguide at the first end is greater than a thickness of the waveguide at the grating, wherein a ratio of thickness of the waveguide at the first end relative to a thickness of the waveguide at the grating is at least about 4:1.

7. The apparatus of claim 6, wherein a ratio of thickness of the waveguide at the first end relative to a thickness of the waveguide at the grating is between about 1:1 to about 5:1.

8. The apparatus of claim 6, further comprising:
an induction coil positioned proximate the first end of the waveguide.

9. The apparatus of claim 6, further comprising:
a light source adapted for selectively illuminating the grating with a light; and
a magnetic storage medium positioned proximate the first end.

10. The apparatus of claim 9, wherein the magnetic storage medium is positioned within a near field of the focused spot.

11. Apparatus for focusing a light, comprising:
a waveguide; and
a curved grating formed in the waveguide, the grating arranged to focus the light incident on the waveguide to a focused spot at a first end of the waveguide, wherein the first end is tangent to, or passes through the focused spot, wherein a thickness of the waveguide at the first end is greater than a thickness of the waveguide at the grating, wherein the first end of the waveguide has a greater refractive index greater than a portion of the waveguide adjacent the grating.

12. The apparatus of claim 11, wherein a ratio of thickness of the waveguide at the first end relative to a thickness of the waveguide at the grating is between about 1:1 to about 5:1.

13. The apparatus of claim 11 further comprising: an induction coil positioned proximate the first end of the waveguide.

14. The apparatus of claim 11 further comprising:
a light source adapted for selectively illuminating the grating with a light; and
a magnetic storage medium positioned proximate the first end.

15. The apparatus of claim 14, wherein the magnetic storage medium is positioned within a near field of the focused spot.

* * * * *